United States Patent [19]

Kenyon

[11] 3,997,960

[45] Dec. 21, 1976

[54] AUTOMOBILE LOCK REMOVAL TOOL

[76] Inventor: David L. Kenyon, 1727 W. Royalton Road, Broadview Heights, Ohio 44147

[22] Filed: Feb. 19, 1976

[21] Appl. No.: 659,529

[52] U.S. Cl. .................................................. 29/263

[51] Int. Cl.$^2$ .......................................... B23P 19/04

[58] Field of Search .................... 29/256, 263, 264; 81/3 R, 71; 70/422

[56] References Cited

UNITED STATES PATENTS

| | | | |
|---|---|---|---|
| 1,458,076 | 6/1923 | Potts | 29/264 |
| 3,564,696 | 2/1971 | Shepanski | 29/256 X |
| 3,816,899 | 6/1974 | Kitts | 29/263 |

*Primary Examiner*—Al Lawrence Smith
*Assistant Examiner*—J. C. Peters
*Attorney, Agent, or Firm*—Bosworth, Sessions & McCoy

[57] ABSTRACT

A tool is disclosed which removes an automobile ignition lock of the type having a keyway and opposed radial extending ears. The tool has an inner cylindrical core with opposed recesses along its sides which engage the ears of the lock and retain the core from turning. The core contains means for securing the core to the lock by insertion of a member, such as a screw, into the keyway of the lock. A hollow cylindrical housing fits over the core, and the forward edge of the housing bears against the lock enclosure or against a collor mounted around the lock enclosure if there is insufficient bearing surface on the enclosure. The lock removal is accomplished by means, such as a threaded rod and nut, for retracting the core into the hollow housing interior. The retracting core pulls the secured lock out of the lock enclosure. Removal of the lock is accomplished without the necessity of disassembling the steering column of the automobile.

8 Claims, 8 Drawing Figures

AUTOMOBILE LOCK REMOVAL TOOL

FIELD OF THE INVENTION

This invention relates to the removal of key-operated lock cylinders such as those found in the steering column of automobiles and similar vehicles.

BACKGROUND OF THE INVENTION

In recent years the design of automobiles and similar vehicles has called for the location of the ignition lock to be on the side of the steering column. This lock serves the dual purpose of locking the steering column to prevent the wheels from being steered and locking the ignition system to prevent the motor from starting.

If the owner of a car loses his keys, jams his ignition lock, or for some other reason wishes to have a lock in his car changed, a locksmith or a mechanic may be called upon to remove the lock cylinder in the steering column and insert a new lock cylinder. In the past, changing the lock cylinder has necessitated removing the steering wheel and disassembling the steering column. The lock cylinder is held in place by a retaining pin, and the steering column had to be disassembled in order to free the retaining pin so that the cylinder could be removed. Removal of the steering wheel is a complicated and time-consuming process. In addition to pulling off the steering wheel, disassembling the steering column involves disconnecting the turn signals and flasher signals. Once the lock is removed, the entire steering column has to be reassembled, and reassembly is even a more complicated procedure. The presence of a collapsable steering column or a tiltable steering wheel adds further complications. As a result, changing the lock cylinder in an automobile or similar vehicle has been an expensive and tedious process.

To remedy some of the problems associated with the removal of automobile ignition locks, the automobile lock removal tool disclosed in my co-pending U.S. Pat. application Ser. No. 557,821, filed Mar. 12, 1975, issued as U.S. Pat. No. 3,972,103, was developed. This tool uses an inner collet which grips the rim around the lock cylinder after removal of the head which covers the cylinder. The tool also embodies an outer housing that is hollow to fit over the collet and has a flat forward edge to bear against the surface of the rim of the lock enclosure around the ignition lock cylinder. Retracting means are provided for pulling the collet into the housing to remove the lock cylinder. This type of lock removal tool has been found to be satisfactory for those automobiles in which the lock head is easily removable and in which the rim of the lock enclosure around the ignition lock provides a sufficient bearing surface for the outer housing, such as in late-model automobiles manufactured by General Motors Corporation. However, in automobiles manufactured by Ford Motor Company and others, the lock head is not easily removable nor is sufficient bearing surface provided on the rim of the lock enclosure around the ignition lock. Since the lock head is not removable, collet-type constructions for gripping the lock cylinder are impractical.

SUMMARY OF THE INVENTION

An object of the present invention is to provide a tool that eliminates the necessity of removing the steering wheel when removing the lock cylinder from the steering column. Another object of the present invention is to provide a means for pulling the lock cylinder from the steering column without damaging the column. Another object is to provide a means by which the lock cylinder can be removed quickly and easily. Yet another object is to provide a means for removing lock cylinders in which the lock head is not easily removable. Still another object is to provide a means for removing lock cylinders in which there is very little or no accessible surface on the enclosure rim around the ignition lock cylinder.

These and other objects are accomplished by the lock removal tool of the present invention which has an inner cylindrical core over which an outer cylindrical housing is installed. The inner core has opposed recesses along its sides which engage the ears of the ignition cap and retain the core from turning during the removal process. Means are provided for securing the core to the lock, such as by a screw which is inserted through the core and threaded into the keyway of the lock cylinder. The outer hollow cylindrical housing preferably has a pair of longitudinal slots along its sides to provide clearance for the ears of the lock cylinder. Means are also provided for retracting the core into the interior of the hollow housing to remove the lock. Preferably, the retracting means comprise a threaded rod which is inserted into the rear of the core, and a nut which fits over the rod outside the housing. By turning the nut with a wrench, the rod retracts, pulling back the core and the secured lock cylinder. An outwardly directed force is exerted on the lock cylinder which breaks the outer surface of the cylinder behind the retaining pin so that the cylinder is easily removed.

DESCRIPTION OF THE PREFERRED EMBODIMENT

Figures 1, 2:
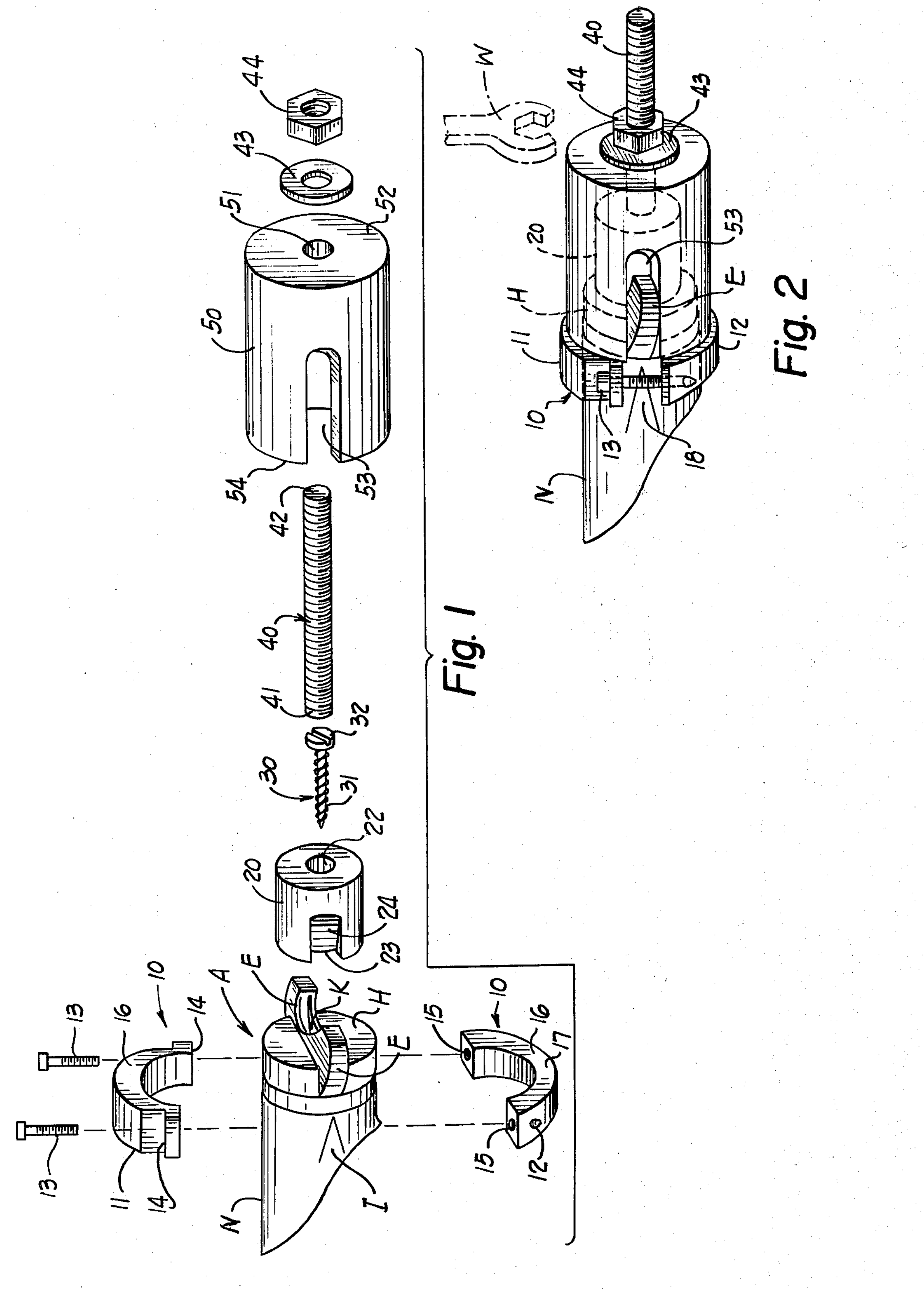
FIG. 1 is an exploded perspective view of a conventional ignition lock mounted on a steering column and the ignition removal tool of the present invention.
FIG. 2 is a perspective view of the lock and the removal tool of FIG. 1 after assembly of the removal tool but before commencement of the lock removal process.
Figure 5:
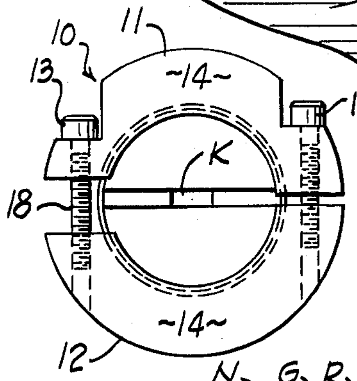
FIG. 5 is an end sectional view taken along line 5—5 of FIG. 4.
Figure 7:
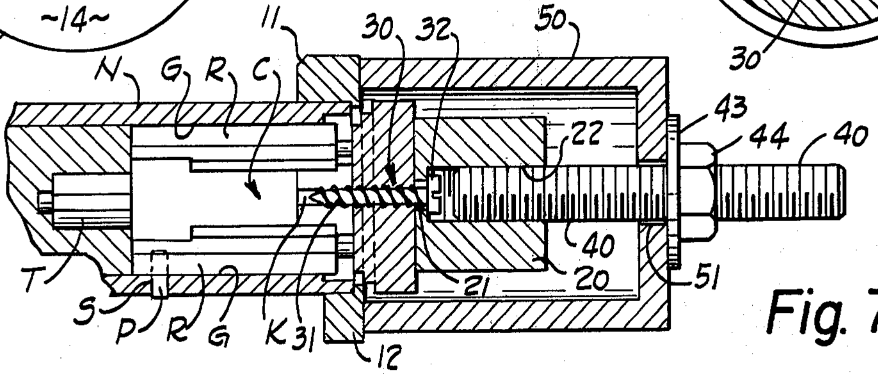
FIG. 7 is a side sectional view taken along line 7—7 of FIG. 3.

Referring more particularly to the drawings and initially to FIG. 1, there is shown a conventional ignition lock assembly A mounted on an automobile steering column. The lock assembly A includes a tubular projecting enclosure N which is part of the steering column and which encloses an ignition lock cylinder C (FIG. 7). A keyway K (FIGS. 5 and 7) is provided in the middle of the cylinder C where a key is inserted to release the locking mechanism inside the cylinder and unlock the lock. When the lock is unlocked, the inner portion of the lock cylinder C can be rotated by turning the key in the keyway K. The rotation of the inner portion of the cylinder C turns a tail T projecting from the rear portion of the lock cylinder (FIG. 7). The tail T fits into a socket member M within the enclosure N. When the socket member M is turned, the steering column unlocks and the ignition system is activated.

A cylindrical head H (FIG. 1) is securely mounted on the forward end of the lock cylinder C and rotates with the inner portion of the cylinder when the lock is unlocked. The head H has a rectangular hole in the center which forms the entrance of the keyway and has two opposed ears E which project from the head and provide a means by which the head is gripped to be turned after the key is inserted in the keyway K. An index mark I on the exterior surface of the lock enclosure N marks the position of the ears E, indicating the status of the ignition lock. When the ears E are aligned with the index mark I, as shown in FIG. 1, the ignition is locked. When the ears E are turned out of alignment with the index mark I, the ignition is unlocked.

The lock cylinder C is retained in the enclosure N by several longitudinal ridges R on the outer portion of the cylinder C (FIG. 7). The ridges R fit within corresponding grooves G in the interior of the enclosure N. The grooves G and ridges R also prevent the outer portion of the lock cylinder from turning as the inner portion rotates when the lock is unlocked. To prevent axial movement of the cylinder, the cylinder C is held in place by a retaining pin P which projects from the rearward portion of the cylinder and fits into a corresponding slot S in the enclosure N. The retaining pin P is urged outwardly by means mounted within the cylinder. The conventional method of removing a lock cylinder has been to disassemble the entire steering column and insert a small tool through the slot S and push the retaining pin P back into the body of the cylinder C. At the same time as the pin was pressed in, the lock head H was simultaneously pulled out to free the cylinder. Finally, the entire steering column was carefully reassembled. The lock cylinder was thus removed, but a large expenditure of time and effort was required.

The removal of ignition locks is, however, greatly simplified by the tool of the present invention. FIG. 1 shows in an exploded perspective view, each of the components of the ignition lock removal tool of the present invention. Each of these components will be discussed in their approximate order of assembly onto the lock assembly A.

Figure 4:
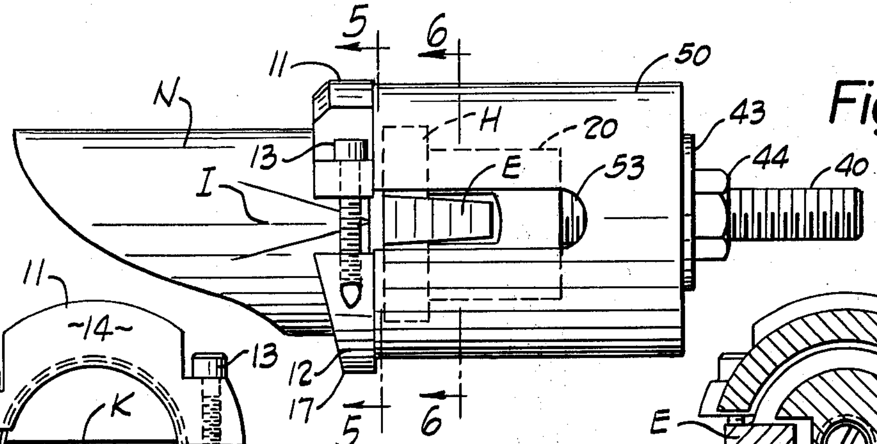
FIG. 4 is a side elevational view taken along line 4—4 of FIG. 3.

The first component assembled is a split ring collar 10. The collar 10 fits around the enclosure N to provide a fixed bearing surface during the removal process. The collar 10 includes an upper member 11 and a lower member 12. The U-shaped members 11 and 12 are secured together by means of screws 13 which fit through threaded holes 14 and 15 in each member. As shown particularly in FIG. 5, the forward edge of the collar 10 is flat and forms a bearing surface 16. The members 11 and 12 do not fit tightly together along one side, so that a gap 18 (FIG. 5) is created. The gap 18 is designed to provide clearance for the index mark I and to allow the collar 10 to fit around enclosures N with smaller circumferences. The thickness of the lower member 12 tapers such that the lower member 12 is thinner along its bottom portion 17 (FIG. 4). This tapering provides clearance for the steering column, while maintaining a flat bearing surface 16. In the case of ignition locks having a construction shown in FIG. 1, it is necessary to install a collar around the enclosure N so that a surface is provided against which the tool can bear in removing the lock cylinder. It is understood that in other lock constructions, the forward rim of the enclosure N may provide a sufficient bearing surface so that the collar 10 can be omitted. While the described split ring construction is preferred, other collar constructions could be used to similar advantage.

Figure 3:
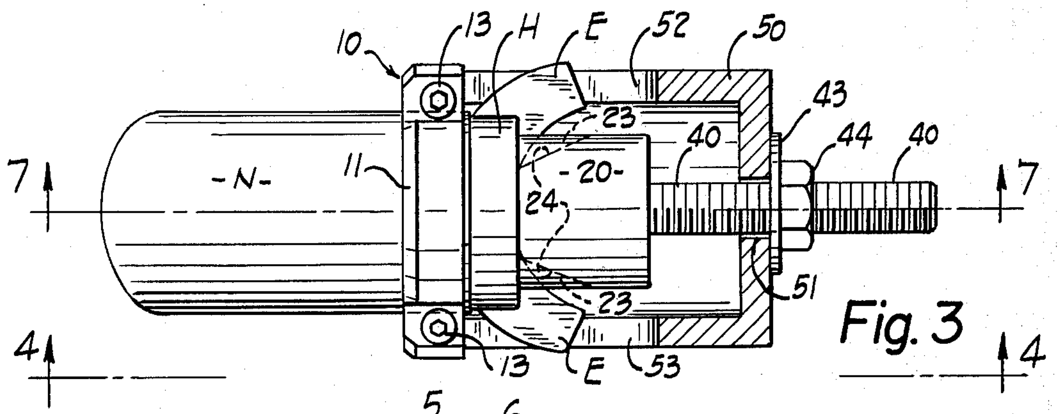
FIG. 3 is a plan view of the lock removal tool of FIG. 2 with the outer housing sectioned.
Figure 6:
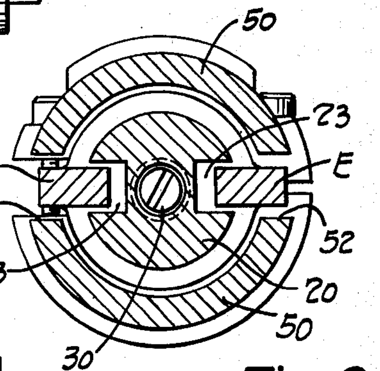
FIG. 6 is an end sectional view taken along line 6—6 of FIG. 4.

The ignition lock cylinder C and the attached head H are pulled from the enclosure N by being secured to a cylindrical core 20. For attachment to the lock, the core 20 has a small hole 21 (FIG. 7) which extends inwardly from the forward edge of the core along the axis of the core. For attachment to the retracting means, the core has a larger threaded bore 22 which extends axially into the core from the rearward surface. Along the side of the core 20 extending from the forward edge are a pair of opposed recesses 23 (FIG. 3). The recesses 23 are provided so that, when the core 20 is pushed against the lock head H, the ears E fit in the recesses 23 and prevent the core from turning (FIGS. 3 and 6). While the recesses 23 may have any of several configurations, the preferred configuration shown in the drawings is a wedge shape with a flat angled surface 24 (FIG. 3). The wedge shape is easily manufactured and is particularly advantageous in engaging the ears E of many designs of ignition locks.

The core 20 is attached to the lock cylinder C and the head H by securing means such as a self-tapping screw 30 which is capable of threading itself into the keyway K. Preferably, the screw 30 is a sheet metal screw of a size which, when threaded into the keyway K, will become firmly secured to the lock cylinder. The screw 30 is mounted in the core 20 by insertion of the screw 30 into the bore 22 as indicated in FIG. 1, so that the screw tail 31 extends from the hole 21 in the forward edge of the core while the head 32 of the screw is retained within the bore 22 (FIG. 7). The screw is then threaded into the keyway K as shown in FIG. 7.

After the core 20 has been secured to the lock cylinder C, the core and the attached cylinder are pulled back, by retracting means such as a threaded rod 40. One end 41 of the rod 40 is attached to the core 20 by threading the end 41 of the rod into the threaded bore 22.

The fixed point for pulling the core back is provided by an outer cylindrical housing 50 which is hollow and fits over the core 20 (FIG. 2). After one end 41 of the rod 40 has been attached to the core 20, the housing 50 fits over the core and the attached rod. The other end 42 of the rod 40 extends through a hole 51 in the rear portion 52 of housing 50. The housing 50 also has longitudinal slots 53 which extend from the forward edge of the housing. The slots 53 provide clearance for the projecting ears E on the lock head H (FIGS. 2 and 3). The flat forward edge 54 of the housing 50 bears against the surface 16 of the collar 10 to provide a fixed point in removing the ignition lock.

After the housing 50 has been installed, the assembly of the tool is completed by placing washer 43 and nut 44 over the end 42 of the rod 40 (FIG. 2). The tool is now ready for the lock removal process. By turning the nut 44, the rod 40 is retracted, pulling back the core 20 and the secured ignition lock cylinder C. The axial force fractures a portion of the lock cylinder C behind the retaining pin P, allowing the cylinder to be easily removed.

The method of operation of the ignition lock removal tool of the present invention comprises an assembly procedure and a removal procedure. First, the lock removal tool is assembled onto the lock assembly A. The split ring collar 10 is installed around the lock enclosure N behind the head H by securing the two members 11 and 12 of the collar together with the screws 13. The collar should be positioned so that each member of the collar is on either side of the indexing mark I on the lock enclosure N. In this manner the gap 18 is opposite the indexing mark I. The core 20 is placed over the center of the head H so that each of the projecting ears E fits within one of the recesses 23. The screw 30 is inserted through the bore 22 into the core 20 and tightened so that it is threaded directly into the keyway K of the cylinder C. Tightening of the screw 30 is continued until the core 20 is tightenly seated on the head H so that it will not turn. One end 41 of the threaded rod 40 is then inserted into the bore 22 of the core 20 and tightened. The housing 50 is placed over the core 20 so that the other end 42 of the threaded rod 40 projects through the hole 51 in the housing, and the pair of opposed slots 53 fits over the projecting ears E on the head H. The washer 43 and nut 44 are installed over the end 42 of the rod 40.

Figure 8:
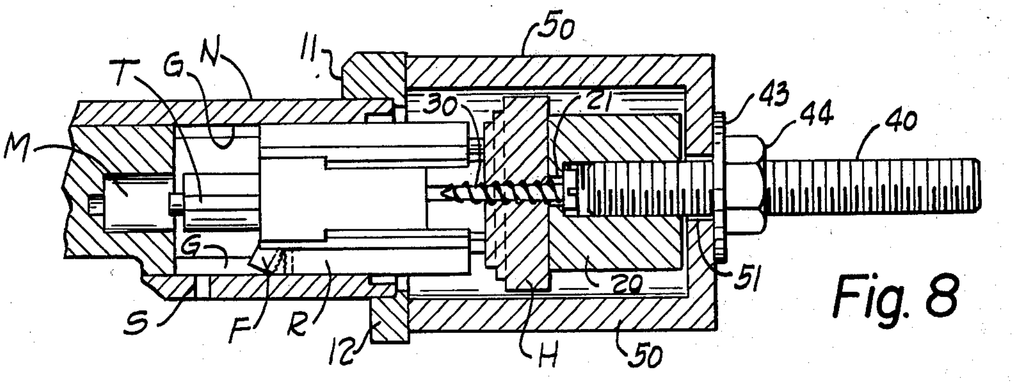
FIG. 8 is a side sectional view of the tool of FIG. 7 as the core is retracted into the housing and the ignition lock removed from its enclosure.

This completes the assembly of the tool over the ignition lock, and the lock removal procedure is ready to begin. The nut 44 is turned by means of a tool such as a wrench W in FIG. 2. As the nut 44 is turned, the rod 40 retracts as the forward edge 54 of the housing bears against the flat surface 16 of the collar 10 which is firmly secured to the lock enclosure N. The retraction of the rod 40 pulls with it the attached core 20 and the secured lock cylinder C. The force causes the rearward portion F of the lock cylinder C behind the retaining pin P to crack freeing the lock cylinder (FIG. 8). The operator of the tool senses this fracture when the pressure required to turn nut 44 is eased. At this point the lock cylinder C can be easily removed from the enclosure N.

After removal of the old lock cylinder, a new lock cylinder can be inserted. Also, when the cylinder is removed, the socket member M can be turned by a screwdriver to unlock the steering column and turn on the ignition and accuate the starter if desired. The old lock cylinder is removed from the removal tool by disassembling the tool in the reverse order from which it was previously assembled. The removal tool is then ready to be used again.

It can be seen that the recesses 23 on the core 20 provide advantages during removal process by preventing the core from turning. Without the recesses 23, the core 20 and the attached rod 40 would tend to rotate as the nut 44 is turned, preventing the nut from engaging the threaded rod 40 to produce the axial movement necessary for lock removal. The presence of the recesses 23, however, eliminate this problem. The recesses 23 engage the ears E on the lock head H to prevent the core 20 and the attached rod 40 from turning, thus allowing the nut 44 to engage the threaded rod 40.

In place of the threaded rod 40 and the nut 44, a bolt could be used in the tool of the present invention. After securing the core to the lock, the housing 50 could be placed over the core 20 and a bolt inserted through the hole 51 and threaded into the bore 22. By turning the head of the bolt with a wrench, the core would be retracted and the lock removed. The threaded rod 40 is preferred, however, because it makes the assembly of the tool easier. One end 41 of the rod 40 is attached to the core 20 before the housing 50 is installed. The housing 50 is thus easily assembled by inserting the other end 42 of the rod 40 through the hole 51 in the housing 50. By contrast, if a bolt is used, the housing 50 must be held in place while the bolt is aligned with the hole 51 and the bore 22, making assembly more difficult.

The tool of the present invention is intended primarily to be used to remove ignition locks of automobiles. It may, however, be utilized to a similar advantage in removing other types of locks.

While the invention has been shown and described with respect to the specific embodiment thereof, this is intended for the purpose of illustration rather than limitation, and other modifications and variations will be apparent to those skilled in the art, all within the intended scope and spirit of the invention.

I claim:

1. A tool for removal of a lock from a lock enclosure, the lock having a keyway, which tool comprises:
- an inner cylindrical core having a central axial bore extending inwardly from its rearward end and having a smaller coaxial hole extending inwardly from its forward end;
- means for securing the core to the lock, said securing means having a self-tapping screw member which is mounted through the forward hole in the core and extends from the core for insertion into the keyway;
- an outer hollow cylindrical housing which fits over the core and the securing means and which has a forward bearing surface; and
- means for retracting the core into the hollow housing interior, whereby the lock secured to the core is removed.

2. A tool for removal of a lock from a lock enclosure, the lock having a keyway and having opposed radially projecting ears, which tool comprises:
- an inner cylindrical core having opposed recesses along its sides extending from the forward edge for engaging the projecting ears and for retaining the core from turning;
- means for securing the core to the lock, said securing means having a member which is inserted into the keyway;
- an outer hollow cylindrical housing which fits over the core and the securing means and which has a forward bearing surface; and
- means for retracting the core into the hollow housing interior, whereby the lock secured to the core is removed.

3. A tool as recited in claim 2 wherein the recesses are wedge-shaped.

4. A tool as recited in claim 3 wherein each recess has a flat angled surface extending from the forward edge of the core.

5. A tool as recited in claim 1, wherein the retracting means comprise:
- a threaded rod which is inserted into a threaded bore in the core and which extends through a hole in the housing; and
- a nut engaging the rod outside the housing, whereby turning the nut causes the rod to move axially, retracting the core.

6. A tool as recited in claim 1 for removal of a lock having opposed radially projecting ears, wherein the housing has opposed longitudinal slots to provide clearance for the ears.

7. A tool for removal of a lock from a lock enclosure, the lock having a keyway, which tool comprises:

an inner cylindrical core;

means for securing the core to the lock, said securing means having a member which is inserted into the keyway;

an outer hollow cylindrical housing which fits over the core and the securing means and which has a forward bearing surface;

means for retracting the core into the hollow housing interior, whereby the lock secured to the core is removed; and a collar mounted around the lock enclosure, having a flat forward surface against which bears the forward bearing surface of the housing.

8. A tool for removal of a lock from a lock enclosure, the lock having a keyway and opposed radially projecting ears, which tool comprises:

a split ring collar mounted around the lock enclosure, having a flat forward surface, said collar comprising an upper portion and a lower portion and removable means for securing together the upper and lower portions;

an inner cylindrical core having a threaded bore at its rearward end and having a smaller hole at its forward end, said core also having opposed wedge-shaped recesses along its sides, each recess having a flat angled surface extending from its forward edge for engaging the ears and for retaining the core from turning;

a self-tapping sheet metal screw mounted through the forward hole in the core and extending from the forward portion of the core, for insertion into the keyway and securing the core to the lock;

an outer cylindrical housing which has a hollow interior extending from its forward edge, the hollow housing fitting over the core and having a flat forward bearing surface around its forward edge which bears against the flat forward surface of the collar, maintaining the housing stationary with respect to the lock enclosure, the housing having a hole in its rearward surface and having opposed longitudinal slots to provide clearance for the ears;

a threaded rod which is mounted in the threaded bore of the core and extends through the hole in the housing; and a nut which engages the rod outside the housing, whereby turning the nut causes the rod to move axially, retracting the attached core and removing the secured lock.

* * * * *